(12) United States Patent
Yuge et al.

(10) Patent No.: US 12,486,173 B2
(45) Date of Patent: Dec. 2, 2025

(54) PRODUCTION METHOD FOR THIN FILM OF ALIGNED CARBON NANOTUBE

(71) Applicants: NEC Corporation, Tokyo (JP); Meijo University, Nagoya (JP)

(72) Inventors: Ryota Yuge, Tokyo (JP); Sumio Iijima, Aichi (JP)

(73) Assignees: NEC CORPORATION, Tokyo (JP); MEIJO UNIVERSITY, Nagoya (JP)

( * ) Notice: Subject to any disclaimer, the term of this patent is extended or adjusted under 35 U.S.C. 154(b) by 437 days.

(21) Appl. No.: 17/629,244

(22) PCT Filed: Jul. 20, 2020

(86) PCT No.: PCT/JP2020/028050
§ 371 (c)(1),
(2) Date: Jan. 21, 2022

(87) PCT Pub. No.: WO2021/015160
PCT Pub. Date: Jan. 28, 2021

(65) Prior Publication Data
US 2022/0242733 A1    Aug. 4, 2022

(30) Foreign Application Priority Data

Jul. 24, 2019  (JP) .................................. 2019-136020

(51) Int. Cl.
*C01B 32/166* (2017.01)
(52) U.S. Cl.
CPC ........ *C01B 32/166* (2017.08); *C01B 2202/08* (2013.01); *C01B 2202/20* (2013.01); *C01P 2004/03* (2013.01)

(58) Field of Classification Search
CPC .............. C01B 32/168; C01B 2202/08; C01B 2202/20; C01P 2004/03
See application file for complete search history.

(56) References Cited

U.S. PATENT DOCUMENTS

2006/0046602 A1   3/2006  Kang
2009/0283405 A1  11/2009  Schmidt et al.
(Continued)

FOREIGN PATENT DOCUMENTS

JP   05-044188 A   2/1993
JP   09-041280 A   2/1997
(Continued)

OTHER PUBLICATIONS

De Heer, Walt A., et al. "Aligned carbon nanotube films: production and optical and electronic properties." Science 268.5212 (Year: 1995).*
(Continued)

*Primary Examiner* — Richard M Rump
(74) *Attorney, Agent, or Firm* — Sughrue Mion, PLLC

(57) ABSTRACT

The object of the present invention is to provide a production method and a production apparatus for a thin film of aligned carbon nanotubes. The present invention relates to a production method for an aligned carbon nanotube film having a film thickness of less than 1000 nm, including a step of causing a part of a dispersion solvent liquid of a carbon nanotube dispersion liquid to permeate to a lower surface side of a filter paper while causing the carbon nanotube dispersion liquid to flow in one direction on an upper surface of the filter paper, and a production apparatus that can be used for said method.

20 Claims, 4 Drawing Sheets

(56) References Cited

U.S. PATENT DOCUMENTS

| | | | |
|---|---|---|---|
| 2010/0101983 A1 | | 4/2010 | Butler et al. |
| 2016/0229695 A1 | * | 8/2016 | Yoshiwara ............ C01B 32/168 |
| 2016/0380274 A1 | * | 12/2016 | Wu ....................... H01M 12/08 |
| | | | 429/405 |
| 2017/0096339 A1 | * | 4/2017 | He ......................... C23C 16/26 |

FOREIGN PATENT DOCUMENTS

| | | | | |
|---|---|---|---|---|
| JP | 2001-093404 A | | 4/2001 | |
| JP | 2005097003 A | * | 4/2005 | ............ B82Y 10/00 |
| JP | 2005-193362 A | | 7/2005 | |
| JP | 2005-334865 A | | 12/2005 | |
| JP | 2008-055375 A | | 3/2008 | |
| JP | 2011-168417 A | | 9/2011 | |
| JP | 2015-040358 A | | 3/2015 | |
| JP | 2017-056579 A | | 3/2017 | |
| JP | 6212677 B1 | | 10/2017 | |
| JP | 6237965 B1 | | 11/2017 | |
| WO | 2011/108545 A1 | | 9/2011 | |
| WO | 2015/045418 A1 | | 4/2015 | |
| WO | 2018/158830 A1 | | 9/2018 | |
| WO | 2019/073531 A1 | | 4/2019 | |

OTHER PUBLICATIONS

Rock, Darman Mitchell. Shear-aligned Carbon Nanotube Mats. Washington State University, 2018.*

Zhang, Jinrui, et al. "Preparation of vertically aligned carbon nanotube/polyaniline composite membranes and the flash welding effect on their supercapacitor properties." RSC advances 6.101 (2016): 98598-98605.*

Lanticse, Leslie Joy, et al. "Shear-induced preferential alignment of carbon nanotubes resulted in anisotropic electrical conductivity of polymer composites." Carbon 44.14 (2006): 3078-3086.*

Office Action issued Feb. 28, 2023 in Japanese Application No. 2021-534020.

International Search Report for PCT/JP2020/028050 dated Sep. 29, 2020 (PCT/ISA/210).

United States Office Action dated Jun. 24, 2024 in U.S. Appl. No. 17/629,156.

* cited by examiner

PRODUCTION METHOD FOR THIN FILM OF ALIGNED CARBON NANOTUBE

CROSS REFERENCE TO RELATED APPLICATIONS

This application is a National Stage of International Application No. PCT/JP2020/028050 filed Jul. 20, 2020, claiming priority based on Japanese Patent Application No. 2019-136020 filed Jul. 24, 2019, the disclosure of which is incorporated herein in its entirety by reference.

TECHNICAL FIELD

The present invention relates to a method and an apparatus for producing a thin film of aligned carbon nanotube.

BACKGROUND ART

Research and development for a wide range of industrial applications are in progress because carbon nanotubes have unique properties which are not found in conventional carbon materials, that is, electrical conduction characteristics, thermal conduction characteristics, photoresponsive characteristics, chemical stability, excellent mechanical strength, light weight, flexibility, nanometer-sized shapes, gas adsorption characteristics, etc. Since carbon nanotubes are fibrous, they are expected to be applied to the production of electronic devices that utilize electrical conduction characteristics and thermal conduction characteristics, and further to be applied as structural materials that utilize high tensile strength and high elastic modulus. However, the characteristics thereof depend on the alignment of fibers, so that the control of the alignment of the fibers becomes an important issue.

Reported examples of the method of controlling the alignment of fibers include a method of producing a fiber-reinforced thermoplastic sheet characterized in that when a dispersion liquid containing reinforcing fibers is supplied to a papermaking surface, the speed of supplying the dispersion liquid is made faster than the speed of traveling a porous support, or suction is performed mainly on the downstream side of the papermaking surface (Patent Literature 1). In this method, fibers having μm-order diameters such as glass fibers are used, but it is known that such fibers and fibers having nanometer-order diameters such as carbon nanotubes behave completely differently.

There are many reports of attempts to produce electronic devices in which fibers having nanometer-sized diameters are arranged while aligning the orientations of the fibers. However, there are many problems that must be solved in the production of electronic devices using aligned fibers, especially in the development of mass production technology, which has hindered the spread of carbon nanotube electronic devices.

Examples of the general method for forming a large-area thin film of carbon nanotubes include a method of spinning and coating the dispersion liquid thereof on an appropriate substrate, a method of separating the dispersion liquid with a filter paper and forming a carbon nanotube film on the surface, etc. However, according to these methods, carbon nanotubes are deposited in any direction, so that no aligned film can be obtained. Reported examples of the method for forming an aligned carbon nanotube thin film include a method of "crystallizing" so that individual carbon nanotubes are aligned two-dimensionally (for example, Patent Literature 2). However, reproducibility is not good because there are unclear points in causes and generation conditions of crystallization. Further, there are also many problems in mass production.

CITATION LIST

Patent Literature

Patent Document 1: Japanese Patent Laid-Open No. H09-41280
Patent Document 2: International Publication No. WO2011/108545 pamphlet

SUMMARY OF INVENTION

Technical Problem

The present invention was invented in consideration of the above problem, and the purpose is to provide a production method and a production apparatus for a thin film of aligned carbon nanotubes.

Solution to Problem

One aspect of the present invention relates to a production method for an aligned carbon nanotube film having a film thickness of less than 1000 nm, comprising a step of causing a part of a dispersion solvent liquid of a carbon nanotube dispersion liquid to permeate to a lower surface side of a filter paper while causing the carbon nanotube dispersion liquid to flow in one direction on an upper surface of the filter paper.

Another aspect of the present invention relates to a production apparatus for an aligned carbon nanotube film having a film thickness of less than 1000 nm, comprising:
  a flow path in contact with an upper surface of a filter paper;
  an inflow port of a carbon nanotube dispersion liquid to the flow path;
  an outflow port of the carbon nanotube dispersion liquid from the flow path; and
  a filtration dispersion solvent liquid discharge portion for discharging a dispersion solvent liquid that has permeated through the filter paper.

Advantageous Effect of Invention

According to the present invention, a production method and a production apparatus for a thin film of aligned carbon nanotubes can be provided.

BRIEF DESCRIPTION OF DRAWINGS

FIG. 3 (side view) is a streamline structure designed to smooth the flow near the inflow port. The arrow indicates the flow direction of the dispersed liquid.

DESCRIPTION OF EMBODIMENTS

Characteristics such as electrical conductivity, thermal conductivity, optical physical properties, tensile strength (mechanical characteristics), etc. of carbon nanotube thin films strongly depend on the alignment of carbon nanotubes. Further, carbon nanotube thin films have flexibility which is not found in ordinary materials. The aligned carbon nanotubes exhibit the characteristics as an aggregate in addition to the individual characteristics. Therefore, the establishment of the method of producing aligned carbon nanotube thin films is expected to make a great contribution to the industrial application of carbon nanotubes.

The present invention relates to a method which uses a dispersion liquid of carbon nanotubes, for example, existing carbon nanotubes; is based on the principle of filtration with filter paper; and further controls the flow of the dispersion liquid to produce a thin film of aligned carbon nanotubes (referred to as "aligned carbon nanotube film" or simply "aligned film"), and a production apparatus therefor.

An embodiment of a method and an apparatus for producing a thin film in which carbon nanotubes are aligned in a certain direction will be described with reference to FIG. 1 by taking a single-walled carbon nanotube as an example.

Figure 1:
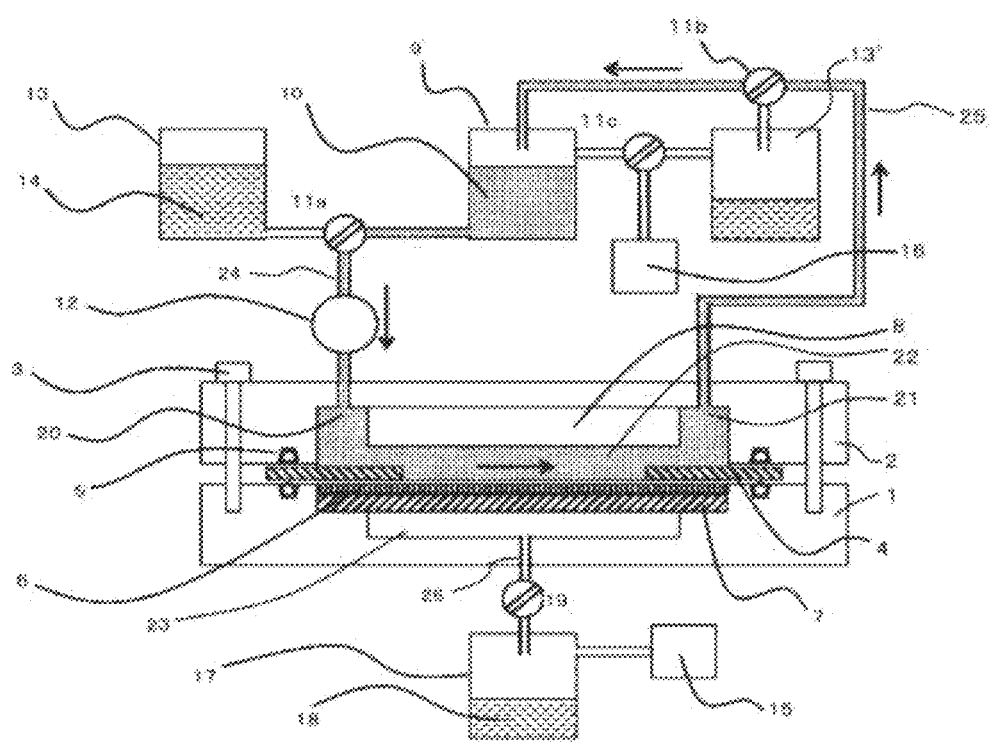
FIG. 1 is a cross-sectional view of an apparatus for producing a thin film of aligned carbon nanotubes.

As shown in FIG. 1, the production apparatus used in the thin film production method according to the present embodiment includes at least a flow path (22) which is in contact with the upper surface of a filter paper (6) for causing a carbon nanotube dispersion liquid to flow in one direction, an inflow port (20) through which the carbon nanotube dispersion liquid flows into the flow path (22), an outflow port (21) through which the carbon nanotube dispersion liquid flows out from the flow path (22), and a filtration dispersion solvent liquid discharge portion (23) from which a filtration dispersion solvent liquid having passed through the filter paper (6) is discharged.

In the production method using the production apparatus of FIG. 1, the carbon nanotube dispersion liquid (hereinafter, also simply referred to as "dispersion liquid") is introduced from the inflow port (20) into the flow path (22), and caused to flow in one direction on the upper surface of the filter paper (6). At the same time, a part of a dispersion solvent liquid of the dispersion liquid is permeated to the lower surface side of the filter paper (6) and discharged to the filtration dispersion solvent liquid discharge portion (23). As a result, one ends of at least some fibers of carbon nanotubes in the dispersion liquid are fixed in pores of the filter paper or in the vicinity of the pores by the flow of the dispersion solvent liquid permeating to the lower surface side of the filter paper (6), and at the same time the other ends of the fibers of the carbon nanotubes move to the downstream side of the flow path by the flow of the dispersion liquid flowing on the upper surface of the filter paper (6). As a result, the carbon nanotubes can be aligned along the flow direction of the dispersion liquid on the filter paper (6).

In the production method of the present embodiment, in order to enhance the alignment of carbon nanotubes, it is preferable to control the dispersion liquid to unidirectionally flow on the filter paper (6), that is, so that the dispersion liquid is less likely to generate turbulent flow and flows as a laminar flow as much as possible. Therefore, the production apparatus of the present embodiment further comprises, as one example, a liquid flow adjusting plate (8) in the flow path (22) installed so as to face the upper surface of the filter paper in order to control the direction in which the dispersion liquid flows along with the upper surface of the filter paper.

Figure 3:
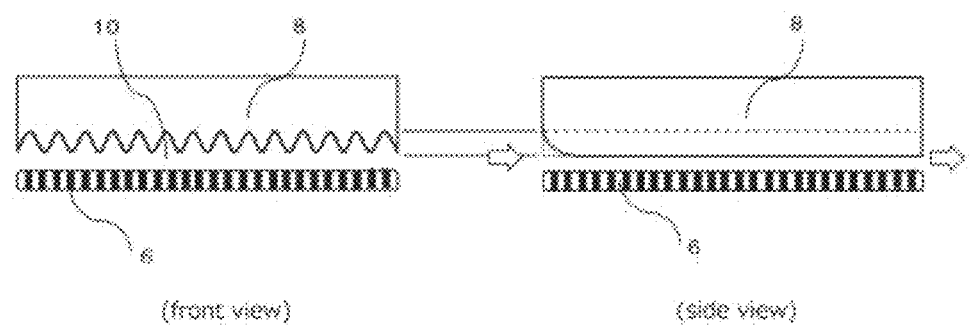
FIG. 3 (front view) is a schematic diagram of a liquid flow adjusting plate with "drainboard-shaped" structure to allow the flow to flow in parallel as seen from the dispersion liquid inflow port side.

As shown in FIG. 3, the liquid flow adjusting plate (8) may have grooves having a so-called "drainboard-shaped" structure, specifically, a plurality of grooves extending in a flow direction on the side facing the upper surface of the filter paper (6), that is, on the surface on the flow path side. When the liquid flow adjusting plate (8) has such grooves, the dispersion liquid flows unidirectionally along the grooves in the flow path formed between the upper surface of the filter paper and the liquid flow adjusting plate. Thereby, the alignment of carbon nanotubes can be more enhanced.

In the present specification, "grooves having the "drainboard-shaped structure"" means a plurality of grooves provided in the flow direction of the flow path, preferably in parallel to each other. The interval between the grooves may be set to, for example, 0.01 to 2 mm, preferably 0.1 to 1 mm, but the interval may be set out of the above range in consideration of the size of apparatus, the liquid feeding condition, the concentration of dispersion liquid, the density of aligned film, and the like. Examples of the groove shape may include a V-shape, a U-shape, a C-shape, an angular U-shape, and the like, and the U-shape is more suitable from the viewpoint of enhancing the fluidity of the dispersion liquid and the alignment of the carbon nanotube.

Further, in order to more control the film thickness and alignment of the carbon nanotube thin film to be produced, a portion on the flow-path inflow port side of the liquid flow adjusting plate (8) may be molded in a streamline-shape in order to smooth the flow, that is, minimize occurrence of turbulent flow.

Here, the streamline-shape is a shape in which the cross-sectional area of the flow path is represented by a function decreasing monotonically in a broad sense with respect to the distance, and further means that the function is smooth, that is, the differential function thereof is continuous. Further, it is preferable that the wall surface is continuous and smooth in addition to the cross-sectional area of the flow path. Such a streamline shape is able to minimize occurrence of turbulent flow when the dispersion liquid flows into the flow path formed between the filter paper (6) and the liquid flow adjusting plate (8), and easily form a laminar flow.

For example, as shown in FIG. 3 (front view), drainboard-shaped grooves are carved on the surface on the flow path side of the liquid flow adjusting plate (8) provided so as to face the upper surface of the filter paper (6), and devised so that the dispersion liquid flows unidirectionally along the grooves. Further, the inflow port side of the liquid flow adjusting plate (8) is devised to be streamline-shape as shown in FIG. 3 (side view) in order to lubricate the flow.

Here, the height of the flow path formed between the filter paper (6) and the liquid flow adjusting plate (8) (the distance between the filter paper (6) and the liquid flow adjusting plate (8)) can be set to, for example, more than 0 mm (that is, the dispersion liquid flows through the grooves of the liquid flow adjusting plate) to 5 mm, preferably 0 to 0.5 mm, more preferably 0.02 to 0.06 mm. However, the height of the flow path may be set out of the above range because it can be appropriately set in consideration of the scale of apparatus, the flow rate/flow velocity of the dispersion liquid, the thickness of the thin film, and the like.

It is preferable that the filter paper (6) and the liquid flow adjusting plate (8) face each other at roughly the same interval from the upstream side to the downstream side of the flow path with the flow path interposed therebetween.

In order to cause a part of the dispersion solvent liquid of the dispersion liquid to permeate to the lower surface side of the filter paper (6), it is necessary to cause a pressure difference between the upper surface side (flow path side) and the lower surface side (filtration dispersion solvent liquid discharge portion side) of the filter paper. Further, in order to practically produce a thin film while enhancing the alignment of the carbon nanotubes in the thin film, it is preferable that the flow rate of the dispersion liquid and the flow velocity on the filter paper can be controlled. Therefore, the production apparatus of FIG. 1 further has the following parts.

In the production apparatus of FIG. 1, a filtration dispersion solvent liquid collection container (17) for collecting the filtration dispersion solvent liquid, a suction pump (15) and a liquid flow adjusting valve (19) are connected via a filtration dispersion solvent liquid discharge path (26) to the filtration dispersion solvent liquid discharge portion (23) side.

Further, a carbon nanotube dispersion liquid container (9) for supplying the carbon nanotube dispersion liquid, a dispersion solvent liquid container (13) for supplying the dispersion solvent liquid, and a liquid feeding pump (12) are connected via a dispersion liquid supply path (24) to the inflow port (20) side of the flow path (22).

Further, in the production apparatus of FIG. 1, the carbon nanotube dispersion liquid container (9), a dispersion solvent liquid collection container (13'), and a suction pump (16) are connected via a dispersion liquid collection path (25) to the outflow port (21) side of the flow path (22).

The pressure difference between the upper surface side (flow path side) and the lower surface side (filtration dispersion solvent liquid discharge portion side) of the filter paper and the ratio of the permeated filtration dispersion solvent liquid can be controlled by several methods. These methods are related to one another, but the first is an adjustment for sucking the filtration dispersion solvent liquid discharge portion side, for example, sucking from the lower surface side of the filter paper (6) by using the suction pump (15), and if necessary using a liquid flow adjusting valve (19) to adjust a discharge liquid amount, thereby adjusting the pressure on the lower surface side of the filter paper, whereby it is possible to adjust the flow rate/flow velocity of the dispersion liquid flowing through the flow path (22), and the ratio of the filtration dispersion solvent liquid permeating to the lower surface side of the filter paper (6).

The second is an adjustment method for applying pressure to the dispersion liquid from the inflow port side, and the dispersion liquid or the dispersion solvent liquid is fed under pressure by using the liquid feeding pump (12) to adjust the pressure on the upper surface side (flow path side) of the filter paper, whereby it is possible to adjust the permeation amount through the filter paper and the flow rate/flow velocity of the dispersion liquid flowing through the flow path (22). In addition to the liquid feeding pump (12), a liquid flow adjusting valve or the like may be provided.

The dispersion liquid container (9) may be installed at an appropriate height above the flow path (22) as having the same function as the liquid feeding pump to apply the pressure to the dispersion liquid to be supplied by the water pressure caused by the difference in height, whereby it is possible to adjust the flow rate/flow velocity and the permeation ratio for supplying to the flow path (22).

The third is an adjustment for sucking the dispersion liquid on the outflow port side. For example, the suction pump (16) is used to suck the dispersion liquid from the downstream side of the flow path (22), and the flow rate of the dispersion liquid to flow out from the outflow port (21) of the flow path (22), so that the flow rate/flow velocity of the dispersion liquid to be supplied to the flow path (22) and the permeation ratio can be adjusted. Further, in addition to the suction pump (16), a liquid flow adjusting valve or the like may be provided.

FIG. 1 illustrates all of the suction pump (15), the liquid feeding pump (12) (containing the water pressure caused by the difference in height), and the suction pump (16), but it is not necessary to include all of them. For example, even if only the liquid feeding pump (12) (containing the water pressure caused by the difference in height) is provided, the dispersion liquid can be supplied to the flow path (22), and the pressure difference can be caused between the upper surface side and the lower surface side of the filter paper. The suction pump (15) and the suction pump (16) may be used secondarily. When the liquid feeding pump (12) does not exist and the water pressure caused by the difference in height is unexpectable, the dispersion liquid can be introduced into the flow path by the suction pump (16). However, in this case, it is usually preferable to suck the filtration dispersion solvent liquid discharge portion side, and therefore, it is preferable to provide the suction pump (15).

In order to adjust the flow rate, flow velocity, and permeation ratio of the dispersion liquid, a liquid flow adjusting valve may be provided at at least one of a front side of the inflow port (as an example, a three-way cock (11a) described later may be used also for this purpose), a rear side of the outflow port (as an example, three-way cocks (11b, 11c) described later may be used also for this purpose), and the filtration dispersion solvent liquid discharge portion (as an example, the liquid flow adjusting valve (19)). These liquid flow adjusting valves may be provided together with the pumps, but it is also preferable that these liquid flow adjusting valves are provided at places where the pumps are not installed. For example, when only the liquid feeding pump (12) (containing the water pressure caused by the difference in height) exists and the suction pump (15) and the suction pump (16) do not exist, the liquid flow adjusting valves are provided behind the outflow port and at the filtration dispersion solvent liquid discharge portion, whereby it is possible to balance the pressure and adjust the flow rate, the flow velocity, and the permeation ratio of the dispersion liquid.

In order to carry out the method of the present embodiment, it is roughly sufficient that the above-mentioned members and parts exist, but for example, the following members and parts may be provided.

For example, in the production apparatus of FIG. 1, the three-way cock (11a) is installed between the carbon nanotube dispersion liquid container (9) and the dispersion solvent liquid container (13). After generating a thin film of carbon nanotubes on the surface of the filter paper, the feeding from the carbon nanotube dispersion liquid container (9) can be switched to the feeding from the dispersion solvent liquid container (13) for cleaning by the three-way cock (11a). By causing the solvent liquid for cleaning to flow through the flow path as described above, it is possible to enhance the alignment of the generated carbon nanotube thin film, perform cleaning, remove non-aligned carbon nanotubes, and the like.

In the production apparatus of FIG. 1, the outflow port (21) of the flow path is connected to the dispersion liquid container (9), that is, at least a part of the dispersion liquid supplied from the dispersion liquid container (9) passes through the flow path (22), and circuits to the dispersion liquid container (9) again. However, in another embodiment, a dispersion liquid collection container (not shown) different from the dispersion liquid container (9) may be provided on the outflow port (21) side of the flow path so that no dispersion liquid is circulated. When the dispersion liquid is circulated, the liquid feeding of the dispersion liquid can be performed by the liquid feeding pump (12) or the like.

Further, the three-way cock (11c) is provided between the carbon nanotube dispersion liquid container (9) and the dispersion solvent liquid collection container (13'). As described above, when the solvent liquid for cleaning is caused to flow after the formation of the carbon nanotube thin film, the flow path of the dispersion liquid collection path (25) can be switched by the three-way cock (11b), whereby the dispersion solvent liquid for cleaning can be collected in the dispersion solvent liquid collection container (13').

Further, although not shown, in one embodiment, in order to dry the carbon nanotube thin film formed on the surface of the filter paper, a gas supply device, a flow path switching device, a gas flow rate control device, and the like may be installed in the production apparatus for the purpose of causing air or a suitable gas (for example, inert gas such as nitrogen or argon) to flow through the flow path of the dispersion liquid.

Figure 2:
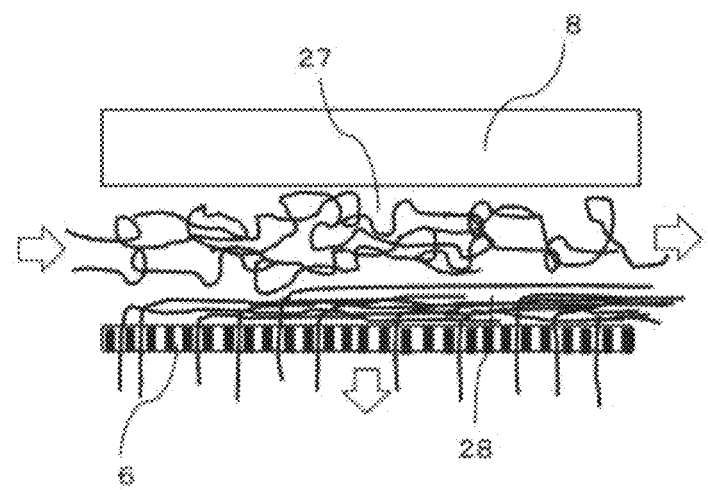
FIG. 2 is a schematic diagram showing the principle that unaligned carbon nanotubes in a dispersion liquid are aligned by a dispersion solvent liquid flow permeating a filter paper and a dispersion liquid flow in the flow direction in a flow path.

The production of the thin film by using the production apparatus of FIG. 1 described above will be summarized. The carbon nanotube dispersion liquid (10) in the carbon nanotube dispersion liquid container (9) is fed from the inflow port (20) onto the upper surface of the paper filter (6) by the liquid feeding pump (12), flows through the flow path (22) between the liquid flow adjusting plate (8) and the upper surface of the paper filter (6) in a certain direction (from left to right as indicated by an arrow), and returns to the dispersion liquid container (9) from the dispersion liquid outflow port (21). When the dispersion liquid flows on the upper surface of the paper filter (6), a part of the dispersion liquid is attracted to the lower surface direction of the paper filter by the suction pump (15), and accumulates in the filtration dispersion solvent liquid collection container (17) connected to the filtration dispersion solvent liquid discharge portion (23). At this time, at least some of the carbon nanotubes in the dispersion liquid stay on the upper surface of the paper filter (6), and one ends thereof or parts thereof are attracted or sucked into the pores of the filter paper as shown in FIG. 2, and are fixed to the surface of the filter paper. On the other hand, the other ends of the carbon nanotubes are aligned in a direction along the flow of the dispersion liquid flowing on the upper surface of the filter paper (6). Further, the carbon nanotubes (27) flowing in the vicinity of the liquid flow adjusting plate (8) return to the dispersion liquid container (9) in a non-aligned state without being fixed to the filter paper as shown in FIG. 2, and is circulated again by the liquid feeding pump (12).

The filter paper (also referred to as "paper filter") (6) is not particularly limited as long as it has pores that allow the dispersion solvent liquid to permeate therethrough and are capable of fixing one ends of the carbon nanotubes, and examples of the filter paper include a fiber aggregate, a resin porous membrane and the like. A resin porous membrane which includes a plurality of single pores as pores and has a smooth membrane surface is more preferable. When a resin porous membrane having a smooth surface is used as a filter paper, a smooth thin film having a uniform thickness can be easily obtained, which may be advantageous, for example, for use in electronic devices, transfer to other substrates, and the like. Further, when a resin porous membrane having a plurality of single pores as pores is used, there is also an advantage that the alignment and surface density of the carbon nanotubes can be easily controlled.

Examples of the resin porous membrane include porous membranes of polycarbonate, polyolefin, fluororesin, polyurethane, polyketone, polyimide and the like, but are not limited to them. It is preferable that the resin is a component that can be removed by heating or eluting the resin with an appropriate solvent after the formation of the carbon nanotube thin film. For example, when a polycarbonate resin porous membrane is used as the filter paper (6), it can be dissolved and removed by using a solvent such as caustic soda after the formation of the carbon nanotube thin film.

The pore diameter of the filter paper can be appropriately selected in consideration of the diameter of the carbon nanotubes, the film thickness of the thin film to be produced, the weight per unit area, the flow rate/flow velocity of the dispersion liquid, etc., but it is generally preferable that the pore diameter of the filter paper is larger than the diameter of the carbon nanotubes. The pore diameter is generally 1 nm or more, preferably 10 nm to 1000 nm, more preferably 50 to 800 nm, still more preferably 100 to 500 nm, for example 100 to 300 nm.

The filter paper (6) can be supported on a support that does not hinder the permeation of the dispersion solvent liquid. The support is not particularly limited as long as it has holes through which the dispersion solvent liquid can pass, and examples thereof include a filter paper support screen (7) having a mesh-like structure. The material of the support is not particularly limited, and metal, plastic, or the like can be used.

In the apparatus of FIG. 1, the filter paper (6) and the filter paper support screen (7) can be installed between a base plate (1) and a top plate (2) so as to be arranged in a substantially horizontal direction (an inclination with respect to the horizontal direction is within 20°, preferably within 10°). A space (recess portion) serving as the flow path (22) is formed on the lower surface of the top plate (2). A space serving as the filtration dispersion solvent liquid discharge portion (23) and a space (recess portion) for accommodating the filter paper (6) and the filter paper support screen (7) are formed on the upper surface of the base plate (1). The base plate (1) and the top plate (2) are fixed so that the flow path (22) and the filtration dispersion solvent liquid discharge portion (23) face each other with the filter paper (6) and the filter paper support screen (7) being interposed therebetween. The base plate (1) and the top plate (2) are provided with opening portions for supplying and discharging the dispersion liquid, and discharging the dispersion solvent liquid. For example, metal, plastic or the like can be used as the materials of the base plate (1) and the top plate (2).

Next, an example of the liquid feeding condition will be described by exemplifying a case where a thin film, preferably a thin film having a film thickness of less than 1000 nm is produced by using the apparatus shown in FIG. 1.

The supply amount of the dispersion liquid to be supplied from the dispersion liquid container (9) may be set to 5 to 500 ml, for example, 10 to 100 ml with respect to the dispersion liquid described later. This dispersion liquid can be supplied over 5 to 60 minutes, for example 5 to 30 minutes. The flow velocity can be 1 to 100 mm/sec, preferably 1 to 20 mm/sec, and more preferably 5 to 10 mm/sec.

The ratio between the liquid flow in the flow path direction of the dispersion liquid and the liquid flow of the dispersion solvent liquid permeating the filter paper depends on the flow velocity, the concentration of the carbon nanotubes, etc., but can be adjusted so that the liquid flow rate of the dispersion solvent liquid permeating the filter paper is equal to, for example, 30 to 90 by volume %, preferably 40 to 80 by volume %, and more preferably 55 to 70 by volume % of the supplied dispersion liquid.

By controlling the liquid flow of the dispersion liquid in the flow path direction and the liquid flow of the dispersion solvent liquid permeating the filter paper as described above, one ends of the carbon nanotubes can be fixed in the pores of the filter paper or in the vicinity of the pores, and at the same time the alignment of the carbon nanotubes can be enhanced by the liquid flow of the dispersion liquid in the flow path direction. Here, the vicinity of the pore means a range in which one end of the carbon nanotube can be fixed by the flow of the dispersion solvent liquid into the pore, and it is, for example, within a range of 2 µm from the outer edge of the pore, preferably within a range of 400 nm from the outer edge of the pore although it depends on the pore diameter, the flow velocity of the dispersion liquid, etc.

The liquid feeding conditions of these dispersion liquid can be appropriately adjusted in consideration of the equipment to be used, the dispersion liquid, the size, film thickness, characteristics, etc. of the thin film to be produced, and may be outside the above range.

Further, in one embodiment, the method according to the present invention further includes a step of collecting the aligned carbon nanotube thin film formed on the upper surface of the paper filter (6) by an appropriate method. Examples of the method for collecting the thin film from the filter paper include a method for peeling the thin film from the filter paper, a method for removing the filter paper by heating the filter paper or dissolving the filter paper with an appropriate solvent, and the like. A relatively thick thin film can be treated as a self-supporting film, and in the case of an ultrathin film, it may be transferred onto an appropriate substrate.

[Carbon Nanotube Dispersion Liquid]

The carbon nanotube dispersion liquid used in the production apparatus and the production method of the above-described aligned carbon nanotube film will be described.

The carbon nanotubes may be single-walled, double-walled, multi-walled, or a mixture thereof, and may be a semiconducting type, metallic type, or a mixture thereof.

In addition, carbon nanotubes in which some of the carbons of the carbon nanotubes are substituted with any functional group, or carbon nanotubes that are modified with any functional group may be used. Examples of the functional group include amino group, carboxyl group, hydroxyl group, carbonyl group and the like. For example, carbon nanotubes with amino groups may be used to improve adhesion to the film (filter paper), which may result in a more aligned and smoother film.

The diameter of carbon nanotubes is not particularly limited, and is generally 0.6 nm or more, preferably 0.8 nm or more, and more preferably 1 nm or more, and generally 50 nm or less, preferably 20 nm or less, more preferably 10 nm or less.

The length of the carbon nanotubes is not particularly limited and generally 0.1 µm or more, preferably 1 µm or more, and in some cases more preferably 10 µm or more. The upper limit of the length can be determined in consideration of the size of thin films to be produced, and the scale of the apparatus, and is generally the length of the flow path (length of filter paper) or shorter, preferably 50 mm or less, more preferably 20 mm or less, even more preferably 1 mm or less. When the length of the carbon nanotubes is 0.5 µm or more, it is easier to obtain a homogeneous thin film over a large area. It is also preferable that the length is 10 mm or less from the view point of ease of synthesis or availability.

The carbon nanotubes used in the method and apparatus for producing a thin film of the present invention may be semiconducting-type, metallic-type, or a mixture thereof.

For example, in terms of application to electronic devices such as FETs, aligned films of semiconducting carbon nanotubes, preferably single-walled semiconducting carbon nanotubes, are useful. For this reason, in one embodiment, it is preferable that the amount of single-walled semiconducting carbon nanotubes of the total amount of carbon nanotubes is more than 67% by mass, and optionally in some cases, 80% by mass or more, and more preferably 90% by mass or more.

On the other hand, aligned films of metallic carbon nanotubes are useful for highly conductive thin films with low sheet resistance. For this reason, in one embodiment, it is preferable that the amount of metallic carbon nanotubes is more than 34% by mass of the total amount of carbon nanotubes, and optionally in some cases, preferably 50% by mass or more, more preferably 80% by mass or more, and even more preferably 90% by mass or more.

Since fibers having diameters in the nanometer-order range such as carbon nanotubes generally have flexibility, it has been extremely difficult to control their alignment to produce a thin film. However, the method and apparatus according to the present invention have an advantage that the alignment of fibers having flexibility such as carbon nanotubes is easily controlled because one ends of the fibers are easily fixed to the pores of the filter paper or in the vicinity of the pores.

Further, the method according to the present invention has an advantage that existing carbon nanotubes can be used. When existing carbon nanotubes are used, there is also an advantage that there is no restriction caused by the synthesizing process of the carbon nanotubes, and it is easy to produce a large-area and uniform aligned film as compared to the method of producing an aligned film by "crystallizing" individual carbon nanotubes so that they are aligned two-dimensionally.

As the carbon nanotube dispersion liquid, a dispersion liquid made by dispersing carbon nanotubes in a dispersion solvent liquid. Examples of the dispersing solvent liquid include a solution in which a dispersing aid to assist dispersion is added to a dispersion medium.

The concentration of carbon nanotubes can be appropriately selected, and for example, the carbon nanotubes are preferably added to the dispersion solvent liquid at a concentration of 1 wtppb or more to 500 wtppb or less, more preferably 10 wtppb or more to 100 wtppb or less, and even more preferably 40 wtppb or more to 60 wtppb or less (0.0001 wt %=1000 ppb). In addition, as described later, during the process of preparing the carbon nanotube dispersion liquid, the dispersion liquid can be purified by separating and removing carbon nanotubes that are not dispersed by ultracentrifugation and the like, and the concentration of the carbon nanotubes in the dispersion liquid after purification is, for example, 500 wtppm or more and 1000 wtppm or less.

The concentration of carbon nanotubes in the carbon nanotube dispersion liquid can be appropriately set in consideration of the film thickness, the areal density and the like of the thin film to be produced, and may be out of the above range.

The dispersion medium is not particularly limited, as long as it is a solvent that allows carbon nanotubes to disperse, examples of which may include water, heavy water, organic solvents (for example, NMP, DMF, DMSO and the like), an ionic liquid and others, and water and heavy water are more preferred.

Examples of the dispersing aid may include surfactants such as non-ionic surfactants, cationic surfactants, anionic surfactants and steroidal surfactants; polymeric solubilizers such as polybenzimidazole (PBI) and polyimide (PI) derivatives; selective solubilizers such as polyfluorene (PFO), PFO alternating copolymers; biopolymer based solubilizers such as DNA and RNA; and other dispersing aids.

Among these, from the viewpoint of ease of removal after thin film formation, surfactants are more preferable. Examples of surfactants include, but not limited to, sodium dodecyl sulfate (SDS), sodium dodecyl benzene sulfate (SDBS), sodium cholic acid (SC), sodium deoxycholate (DOC), sodium taurocholate, sodium taurodeoxycholate (TDOC), and others, and the non-ionic surfactants described later.

The nonionic surfactant may be appropriately selected, and it is preferred to use nonionic surfactants constituted by a hydrophilic portion which is not ionized and a hydrophobic portion such as an alkyl chain, for example, nonionic surfactants having a polyethylene glycol structure exemplified by polyoxyethylene alkyl ethers, and alkyl glucoside based nonionic surfactants, singly or in combination. As such a nonionic surfactant, polyoxyethylene alkyl ether represented by Formula (1) is preferably used. In addition, the alkyl moiety may have one or a plurality of unsaturated bonds.

$$C_nH_{2n+1}(OCH_2CH_2)_mOH \qquad (1)$$

wherein, n=preferably 12 to 18, and m=10 to 100, preferably 20 to 100.

In particular, a nonionic surfactant specified by polyoxyethylene (n) alkyl ether (wherein n=20 or more and 100 or less, and the alkyl chain length is C12 or more and C18 or less) such as polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether is more preferred. Commercially available examples may include Brij based surfactants such as Brij S100, Brij L23, Brij C20, Brij S20, Brij 010, Brij C10, Brij S10, Brij 020, Brij 5100 and others. In addition, N,N-bis[3-(D-gluconamido)propyl]deoxycholamide, n-dodecylβ-D-maltoside, octyl β-D-glucopyranoside, and digitonin may also be used.

As the nonionic surfactant, Tween based surfactants such as polyoxyethylene sorbitan monostearate (molecular formula: $C_{64}H_{126}O_{26}$, trade name: Tween 60, manufactured by Sigma-Aldrich, etc.), polyoxyethylene sorbitan trioleate (molecular formula: $C_{24}H_{44}O_6$, trade name: Tween 85, manufactured by Sigma-Aldrich, etc.), Triton based surfactants such as octylphenol ethoxylate (molecular formula: $C_{14}H_{22}O(C_2H_4O)_n$, n=1 to 10, trade name: Triton X-100, manufactured by Sigma-Aldrich, etc.), polyoxyethylene (40) isooctylphenyl ether (molecular formula: $C_8H_{17}C_6H_{40}$ $(CH_2CH_2O)_{40}H$, trade name: Triton X-405, manufactured by Sigma-Aldrich, etc.), poloxamer (molecular formula: $C_5H_{10}O_2$, trade name: Pluronic, manufactured by Sigma-Aldrich, etc.), polyvinyl pyrrolidone (molecular formula: $(C_6H_9NO)_n$, n=5 to 100, manufactured by Sigma-Aldrich, etc.) may also be used.

The concentration of the surfactant in the dispersion solvent liquid is preferably from the critical micelle concentration or more, and generally 10 times or more, preferably 50 times or more of the critical micelle concentration, for example 0.05% by mass or more, and preferably 5% by mass or less, more preferably 2% by mass or less. As used herein, the critical micelle concentration (CMC) refers to the concentration serving as an inflection point of the surface tension measured by, for example, changing the concentration of an aqueous surfactant solution using a surface tensiometer such as a Wilhelmy surface tensiometer at a constant temperature. As used herein, the "critical micelle concentration" is a value under atmospheric pressure at 25° C.

The method for preparing the carbon nanotube dispersion liquid is not particularly limited, and conventionally known methods can be appropriately applied. For example, a method in which a mixture comprising carbon nanotubes, and a dispersion solvent liquid comprising a dispersion medium and a dispersing aid is subjected to stirring or sonication to sufficiently separate aggregated carbon nanotubes. In addition to or instead of the sonication, carbon nanotubes may be dispersed by a mechanical shear force. In addition, after the dispersion process, carbon nanotubes not sufficiently dispersed may be separated and removed using an ultracentrifugation treatment or the like. Carbon nanotubes are preferably dispersed apart from each other, but in some cases, a plurality of carbon nanotubes may gather to form a bundle.

[Thin Film of Aligned Carbon Nanotubes]

One aspect of the present invention relates to an aligned carbon nanotube film produced by using the above-mentioned production method and production apparatus. According to the above-mentioned method and apparatus of the present invention, it is possible to produce a two-dimensionally formed large-area and uniform film of aligned carbon nanotube without using a step of forming a three-dimensional structure such as crystallization.

The alignment and thickness of the carbon nanotube thin film deposited on the upper surface of the paper filter (6) can be determined to desired ranges by adjusting the length of each carbon nanotube, the concentration and degree of dispersion of the carbon nanotube dispersion liquid (10), the liquid feeding amount of the liquid feeding pump (12), the suction pressure of each of the two suction pumps (15, 16), the cleaning time by the dispersion solvent liquid (13), etc.

The film thickness of the aligned film is not particularly limited, and can be appropriately selected depending on an intended purpose. For example, the method and apparatus according to the present invention are also suitable for producing thin films having film thicknesses of less than 1000 nm. In one embodiment, the aligned film may be a self-supporting film, and the film thickness is, for example, 10 nm to 100 nm, preferably 50 nm to 100 nm. Further, in one embodiment, the aligned film may be an ultrathin thin film, and the film thickness is, for example, 0.6 nm to 100 nm, more preferably 1.0 nm to 10 nm, and further preferably 1 nm to 5 nm. In some cases, the aligned film is a monolayer, that is, the film thickness of the aligned film is the same as the diameter of the carbon nanotubes.

The weight per unit area of the aligned film is not particularly limited, and may be appropriately set according to an intended use of the aligned film. For example, in the case of a thin film of aligned carbon nanotubes, preferably a thin film having a film thickness of 1000 nm or less, the weight per unit area can be preferably set to 1 to 20 ng/cm$^2$, more preferably 2 to 10 ng/cm$^2$.

In a certain embodiment, it is also preferable that the aligned film includes a monolayer region at least in a part thereof. The monolayer region is a region in which the aligned carbon nanotubes are close to or in contact with one another to form a monolayer film, or a region in which the carbon nanotubes are aligned but the carbon nanotubes are in little contact (or no contact) with one another.

As the method for forming an aligned film of carbon nanotubes, for example, Xiaowei H et al. (Nature Nanotechnology, 2016, 633-638) reports that a large-area thin film in which carbon nanotubes are spontaneously aligned is produced. However, in the method using such spontaneous alignment, it is difficult to obtain a monolayer film of aligned carbon nanotubes, particularly an aligned film in which carbon nanotubes are in little contact (or no contact) with one another. However, according to the method and apparatus of the present invention, since the areal density of carbon nanotubes can be set in a desired range, it is possible to form an oriented film containing a monolayer region in which the contact among carbon nanotubes is little, which has been difficult by the method using spontaneous alignment.

The number density of the carbon nanotubes in a thin film of aligned carbon nanotubes is not particularly limited, and for example, preferably $1 \times 10^9$ to $1 \times 10^{14}$ nanotubes/cm$^2$, more preferably $2 \times 10^9$ to $5 \times 10^{13}$ nanotubes/cm$^2$, and more preferably $1 \times 10^{10}$ to $1 \times 10^{13}$ nanotubes/cm$^2$. Of course, the number density may be appropriately selected depending on applications.

The number density of carbon nanotubes can be calculated by counting the number of carbon nanotubes from a microscopic image.

In one embodiment, one ends of at least some of the carbon nanotube fibers in the aligned carbon nanotube film may be curved in an out-of-surface direction of the aligned film due to one ends of the carbon nanotube fibers being fixed in the pores of the filter paper during a production process. The aligned carbon nanotube film having such protrusions may have, for example, an advantage of an electron field emission material or the like. Further, in another embodiment, the out-of-surface protruding fiber ends as described above may be appropriately removed to enhance smoothness.

The aligned film, in particular the aligned film of semiconducting carbon nanotubes, in particular the aligned film having an ultra-thin thickness according to the present embodiment can be suitably used for electronic devices such as FET transistors.

In addition, since the optical anisotropy, the electrical anisotropy, the thermal anisotropy, and the like can be easily controlled by aligning carbon nanotubes, the aligned film of the present embodiment can also be suitably used for applications such as various sensors, such as infrared sensors, gas sensors, and the like, and energy device electrodes.

EXAMPLES

1. Preparation of Carbon Nanotube Dispersion Liquid

Carbon nanotubes (carbon nanotubes manufactured by Meijo Nanocarbon Co. (average diameter: about 1.5 nm, average length: about 1 μm)) were added to a dispersion solvent liquid (0.06 wt % Brij S100 solution), and the carbon nanotubes were dispersed by stirring to obtain a carbon nanotube dispersion liquid (concentration: about 40 wtppb).

2. Production Apparatus for Thin Film

A polycarbonate membrane film (produced by Advantec Toyo Ltd., pore diameter: 0.2 μm) 47 mm×47 mm was used as the paper filter (6). The height of the flow path (the distance between the filter paper (6) and the liquid flow adjusting plate (8)) was set so that the tips of protruding portions of drainboard-shaped grooves were in contact with the filter paper. As shown in FIG. 3, an adjusting plate which was molded in a stream-line shape on the inflow port side thereof and had the drainboard-shaped grooves, that is, U-shaped grooves which extended in the flow direction of the flow path and were arranged at an interval of 0.3 mm was used as the liquid flow adjusting plate (8).

3. Production of Thin Film (1) The flow rate was controlled by using the liquid feeding pump (12), the suction pumps (15) and (16), and the liquid flow adjusting valve (19), and a total of 100 ml of the carbon nanotube dispersion liquid was adjusted so that the ratio between the flow rate of the liquid flowing out from the outflow port of the flow path and the flow rate of the liquid which permeated the filter paper and was collected as the filtration dispersion solvent liquid was equal to about 1:2, and fed over about 30 minutes.

(2) Next, only the dispersion solvent liquid was caused to flow under the same condition to remove non-aligned carbon nanotubes and to enhance the alignment of the carbon nanotubes fixed on the surface of the filter paper.

Figure 4:
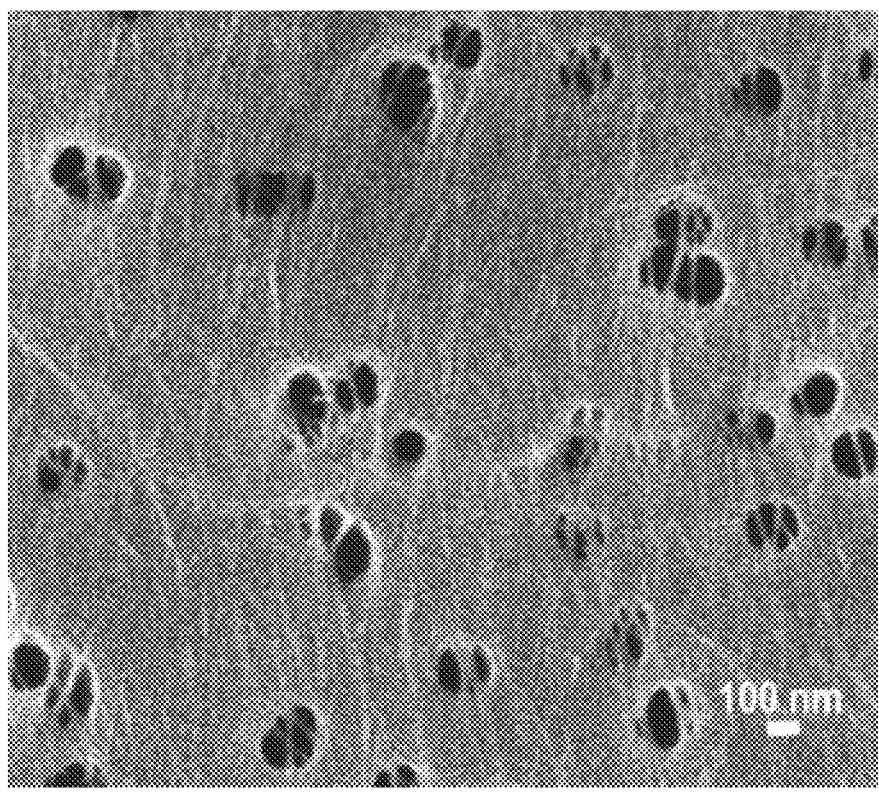
FIG. 4 is a scanning electron micrograph of aligned single-walled carbon nanotubes formed on a commercially available polycarbonate membrane filter membrane prepared by the above method.

(3) Next, air was caused to flow through the flow path to dry the carbon nanotube thin film formed on the surface of the filter paper, and observed with a scanning electron microscope (FIG. 4). Thereafter, an aligned carbon nanotube thin film was obtained.

4. Evaluation of Produced Thin Film

In the produced aligned film, as shown in FIG. 4, it could be confirmed that one ends of the carbon nanotubes were fixed in the pores of the filter paper or in the vicinity of the pores, and the carbon nanotubes were oriented in the flow direction. Further, many monolayer regions were observed, and $10^{11}$ to $10^{12}$ nanotubes/cm$^2$ existed.

While the invention has been described with reference to example embodiments and examples thereof, the invention is not limited to these embodiments and examples. Various changes that can be understood by those of ordinary skill in the art may be made to forms and details of the present invention without departing from the spirit and scope of the present invention.

SUPPLEMENTARY NOTE

The whole or part of the example embodiments disclosed above can be described as, but not limited to, the following supplementary notes.

Supplementary Note 1

A production method for an aligned carbon nanotube film having a film thickness of less than 1000 nm, comprising a step of causing a part of a dispersion solvent liquid of a carbon nanotube dispersion liquid to permeate to a lower surface side of a filter paper while causing the carbon nanotube dispersion liquid to flow in one direction on an upper surface of the filter paper.

Supplementary Note 2

The production method according to Supplementary note 1, wherein one ends of at least some of carbon nanotubes in the carbon nanotube dispersion liquid are fixed in pores of a filter paper or in the vicinity of the pores by flow of the dispersion solvent permeating to the lower surface side of the filter paper, and at the same time, the other ends of the carbon nanotubes are aligned in a flow direction of the carbon nanotube dispersion liquid flowing along the upper surface of the filter paper.

Supplementary Note 3

The production method according to Supplementary note 1 or 2, wherein the dispersion solvent liquid is caused to permeate to the lower surface side of the filter paper by sucking from the lower surface side of the filter paper.

Supplementary Note 4

The production method according to any one of Supplementary notes 1 to 3, wherein the carbon nanotube dispersion liquid is caused to flow in one direction along a groove of a liquid flow adjusting plate through a flow path between the upper surface of the filter paper and the liquid flow adjusting plate, the liquid flow adjusting plate being installed so as to face the upper surface of the filter paper and having the groove extending in a flow direction on a surface on a flow path side thereof.

Supplementary Note 5

The production method according to Supplementary note 4, wherein a dispersion liquid inflow port side of the liquid flow adjusting plate has a streamline shape.

Supplementary Note 6

The production method according to any one of Supplementary notes 1 to 5, wherein the carbon nanotube dispersion liquid is supplied from a position higher than the upper surface of the filter paper or is supplied under pressure by using a liquid feeding pump.

Supplementary Note 7

The production method according to any one of Supplementary notes 1 to 6, wherein the carbon nanotube dispersion liquid is sucked from a downstream side of a flow path.

Supplementary Note 8

The production method according to any one of Supplementary notes 1 to 7, further comprising a step of causing a solvent liquid for cleaning to flow through a flow path of the carbon nanotube dispersion liquid.

Supplementary Note 9

The production method according to any one of Supplementary notes 1 to 8, further comprising a step of causing air or gas to flow through a flow path of the carbon nanotube dispersion liquid to dry the aligned carbon nanotube film formed on the upper surface of the filter paper.

Supplementary Note 10

A production apparatus for an aligned carbon nanotube film having a film thickness of less than 1000 nm, comprising:

a flow path in contact with an upper surface of a filter paper;
an inflow port of a carbon nanotube dispersion liquid to the flow path;
an outflow port of the carbon nanotube dispersion liquid from the flow path; and
a filtration dispersion solvent liquid discharge portion for discharging a dispersion solvent liquid that has permeated through the filter paper.

Supplementary Note 11

The production apparatus according to Supplementary note 10, further comprising a suction pump connected to the filtration dispersion solvent liquid discharge portion.

Supplementary Note 12

The production apparatus according to Supplementary note 10 or 11, further comprising a liquid flow adjusting plate that is installed so as to face the upper surface of the filter paper and has a groove extending in a flow direction on a surface on a flow path side thereof.

Supplementary Note 13

The production apparatus according to Supplementary note 12, wherein a dispersion liquid inflow port side portion of the liquid flow adjusting plate has a streamline shape.

Supplementary Note 14

An aligned film having a film thickness of less than 1000 nm in which carbon nanotubes are aligned, wherein fiber ends of at least some of the carbon nanotubes are curved in an out-of-surface direction of the aligned film.

INDUSTRIAL APPLICABILITY

The present invention relates to a production method for a thin film made of aligned carbon nanotubes, and an apparatus therefor. In a thin film of carbon nanotubes, individual fibers are generally dispersed in a non-aligned manner, but a thin film in which individual fibers are aligned in a certain direction is indispensable according to an intended purpose. For example, it is known that the current and heat flowing through individual carbon nanotubes strongly depend on the fiber direction, so that anisotropy appears in current characteristics, thermal characteristics, photoresponsive characteristics, etc. depending on the alignment of fibers when a thin film is formed. For example, in the case of a FET transistor made of a carbon nanotube thin film, the electron mobility is remarkably affected by the alignment of the tubes. In order to solve such a problem, a thin film of fibers whose fiber direction is controlled is an extremely important material in industry, and a technique for producing such a thin film is important.

EXPLANATION OF REFERENCE

1 Base plate
2 Top plate
3 Clamping bolt
4 Support ring
5 O-ring for holding a support ring
6 Filter paper
7 Filter paper support screen 8 Liquid flow adjusting plate
9 Carbon nanotube dispersion liquid container
10 Carbon nanotube dispersion liquid
11a Three-way cock
11b Three-way cock
11c Three-way cock
12 Liquid feeding pump
13 Dispersion solvent liquid container
13' Dispersion solvent liquid collection container
14 Dispersion solvent liquid
15 Suction pump
16 Suction pump
17 Filtration dispersion solvent liquid collection container
18 Filtration dispersion solvent liquid
19 Liquid flow adjusting valve
20 Inflow port
21 Outflow port
22 Flow path
23 Filtration dispersion solvent liquid discharge portion
24 Dispersion liquid supply path
25 Dispersion liquid collection path
26 Filtration dispersion solvent liquid discharge path
27 Non-aligned carbon nanotubes
28 Aligned carbon nanotubes

The invention claimed is:

1. A production method for an aligned carbon nanotube film having a film thickness of less than 1000 nm, comprising:
    installing a liquid flow adjusting plate having a groove extending in a flow direction of a carbon nanotube dispersion liquid to face an upper surface of a filter paper, and
    permeating a part of a dispersion solvent liquid of the carbon nanotube dispersion liquid to a lower surface side of the filter paper while flowing the carbon nanotube dispersion liquid in one direction along the groove in a flow path between the upper surface of the filter paper and the liquid flow adjusting plate,
    wherein the groove is a plurality of grooves extending in the flow path direction of the carbon nanotube dispersion liquid and parallel to each other, and,
    wherein an interval between each of the plurality of grooves is in the range of 0.01 mm and 2 mm.

2. The production method according to claim 1, wherein an interval between each of the plurality of grooves is in the range of 0.1 mm and 1 mm.

3. The production method according to claim 1, wherein one ends of at least some of carbon nanotubes in the carbon nanotube dispersion liquid are fixed in pores of a filter paper or in the vicinity of the pores by flow of the dispersion solvent liquid permeating to the lower surface side of the filter paper, and at the same time, the other ends of the carbon nanotubes are aligned in the flow direction of the carbon nanotube dispersion liquid flowing along the upper surface of the filter paper.

4. The production method according to claim 1, wherein the dispersion solvent liquid is caused to permeate to the lower surface side of the filter paper by sucking from the lower surface side of the filter paper.

5. The production method according to claim 1, wherein a dispersion liquid inflow port side of the liquid flow adjusting plate has a streamline shape.

6. The production method according to claim 1, wherein the carbon nanotube dispersion liquid is supplied from a position higher than the upper surface of the filter paper or is supplied under pressure by using a liquid feeding pump.

7. The production method according claim 1, wherein the carbon nanotube dispersion liquid is sucked from a downstream side of the flow path.

8. The production method according to claim 1, further comprising a step of causing a solvent liquid for cleaning to flow through the flow path of the carbon nanotube dispersion liquid.

9. The production method according claim 1, further comprising a step of causing air or gas to low through the flow path of the carbon nanotube dispersion liquid to dry the aligned carbon nanotube film formed on the upper surface of the filter paper.

10. A production method for an aligned carbon nanotube film having a film thickness of less than 1000 nm, comprising:
    installing a liquid flow adjusting plate having a groove extending in a flow direction of a carbon nanotube dispersion liquid to face an upper surface of a filter paper, and
    permeating a part of a dispersion solvent liquid of the carbon nanotube dispersion liquid to a lower surface side of the filter paper while flowing the carbon nanotube dispersion liquid in one direction along the groove in a flow path between the upper surface of the filter paper and the liquid flow adjusting plate,
    wherein the groove is a plurality of grooves extending in the flow path direction of the carbon nanotube dispersion liquid and parallel to each other, and
    wherein each of the plurality of grooves is V-shaped, U-shaped, C-shaped, or angularly U-shaped.

11. The production method according to claim 10, wherein one ends of at least some of carbon nanotubes in the carbon nanotube dispersion liquid are fixed in pores of a filter paper or in the vicinity of the pores by flow of the dispersion solvent liquid permeating to the lower surface side of the filter paper, and at the same time, the other ends of the carbon nanotubes are aligned in the flow direction of the carbon nanotube dispersion liquid flowing along the upper surface of the filter paper.

12. The production method according to claim 10, wherein the dispersion solvent liquid is caused to permeate to the lower surface side of the filter paper by sucking from the lower surface side of the filter paper.

13. The production method according to claim 10, wherein a dispersion liquid inflow port side of the liquid flow adjusting plate has a streamline shape.

14. The production method according claim 10, wherein the carbon nanotube dispersion liquid is supplied from a position higher than the upper surface of the filter paper or is supplied under pressure by using a liquid feeding pump.

15. The production method according claim 10, wherein the carbon nanotube dispersion liquid is sucked from a downstream side of the flow path.

16. The production method according to claim 10, further comprising a step of causing a solvent liquid for cleaning to flow through the flow path of the carbon nanotube dispersion liquid.

17. The production method according to claim 10, further comprising a step of causing air or gas to low through the flow path of the carbon nanotube dispersion liquid to dry the aligned carbon nanotube film formed on the upper surface of the filter paper.

18. A production apparatus for an aligned carbon nanotube film having a film thickness of less than 1000 nm, comprising:
    a flow path along an upper surface of a filter paper;

a liquid flow adjusting plate having a groove extending in a flow direction of a carbon nanotube dispersion liquid and installed to face an upper surface of a filter paper;
an inflow port of a carbon nanotube dispersion liquid to the flow path;
an outflow port of the carbon nanotube dispersion liquid from the flow path; and
a filtration dispersion solvent liquid discharge portion for discharging a dispersion solvent liquid that has permeated through the filter paper,
wherein the groove is a plurality of grooves extending in the flow path direction of the carbon nanotube dispersion liquid and parallel to each other, and
wherein an interval between each of the plurality of grooves is in the range of 0.01 mm and 2 mm.

19. The production apparatus according to claim 18, wherein an interval between each of the plurality of grooves is in the range of 0.1 mm and 1 mm.

20. The production apparatus according to claim 18, wherein each of the plurality of grooves is V-shaped, U-shaped, C-shaped, or angularly U-shaped.

\* \* \* \* \*